US007987039B2

(12) United States Patent
Takagawa

(10) Patent No.: US 7,987,039 B2
(45) Date of Patent: Jul. 26, 2011

(54) AIR-FUEL RATIO CONTROLLER FOR INTERNAL COMBUSTION ENGINE

(75) Inventor: Tomoyuki Takagawa, Buckinghamshire (GB)

(73) Assignee: Denso Corporation, Kariya (JP)

( * ) Notice: Subject to any disclaimer, the term of this patent is extended or adjusted under 35 U.S.C. 154(b) by 264 days.

(21) Appl. No.: 12/183,903

(22) Filed: Jul. 31, 2008

(65) Prior Publication Data

US 2009/0037078 A1 Feb. 5, 2009

(30) Foreign Application Priority Data

Jul. 31, 2007 (JP) ................................ 2007-198323

(51) Int. Cl.
*B60T 7/12* (2006.01)

(52) U.S. Cl. ......... 701/103; 701/109; 701/114; 701/115

(58) Field of Classification Search .................. 703/103, 703/104, 108, 109, 114, 115; 123/674
See application file for complete search history.

(56) References Cited

U.S. PATENT DOCUMENTS 4,633,840 A * 1/1987 Saito et al. .................... 123/682
5,634,454 A 6/1997 Fujita
6,324,893 B1 * 12/2001 Watanabe et al. ............ 73/23.32
7,270,119 B2 * 9/2007 Mitsutani ...................... 123/674
2004/0209734 A1 * 10/2004 Mitsutani ...................... 477/111
2010/0070159 A1 * 3/2010 Iwahashi et al. .............. 701/105

FOREIGN PATENT DOCUMENTS

JP 61-28739 2/1986
JP 3-222841 10/1991
JP 4-175435 6/1992
JP 8-246926 9/1996
JP 9-42025 2/1997
JP 2000-104600 4/2000

OTHER PUBLICATIONS

Office Action (2 pgs.) dated Jan. 11, 2011 issued in corresponding Japanese Application No. 2007-198323 with an at least partial English-language translation thereof (2 pgs.).

* cited by examiner

*Primary Examiner* — John T Kwon
(74) *Attorney, Agent, or Firm* — Nixon & Vanderhye P.C.

(57) ABSTRACT

In a system where an air-fuel ratio feedback correction amount is learned when its variation width is within a stable determination value, the stable determination value is set at larger value when a deviation amount of the correction amount becomes larger. When the air-fuel ratio feedback correction amount is rapidly changed after the learning is completed, the stable determination value is increased to moderate the learning condition and accelerate the learning speed (update speed of the learning value). Hence, the air-fuel ratio feedback correction amount is immediately learned. Furthermore, when a behavior of the air-fuel ratio feedback correction amount is stable, the stable determination value is made small to avoid an erroneous learning of the air-fuel ratio feedback correction amount.

12 Claims, 7 Drawing Sheets

AIR-FUEL RATIO CONTROLLER FOR INTERNAL COMBUSTION ENGINE

CROSS-REFERENCE TO RELATED APPLICATION

This application is based on Japanese Patent Application No. 2007-198323 filed on Jul. 31, 2007, the disclosure of which is incorporated herein by reference.

FIELD OF THE INVENTION

The present invention relates to an air-fuel ratio controller for an internal combustion engine, which is provided with a function of an air-fuel ratio feedback correction amount learning.

BACKGROUND OF THE INVENTION

As shown in JP-2000-104600A, in an engine control system, air-fuel ratio or rich/lean of exhaust gas is detected by an exhaust gas sensor (air-fuel ratio sensor or oxygen sensor), and air-fuel ratio (fuel injection quantity) is feedback corrected based on the detected value in such a manner that the air-fuel ratio becomes consistent with a target air-fuel ratio. This feedback correction amount is learned, and its learning value is stored in a backup RAM which is a rewritable non-volatile memory. The backup RAM holds the data by using of in-vehicle battery even while the engine is stopped. Based on the learning value, the air-fuel control is performed.

When the in-vehicle battery is removed from the vehicle, the backup power for the backup RAM is interrupted, so that learning data stored in the memory are erased, which is referred to as a battery-clear. After the battery-clear, it is necessary to perform a learning of the feedback correction amount from the first (initial value). During a period until the learning is completed, an accuracy of the air-fuel ratio control is deteriorated. Hence, it is desirable to reduce the learning period after the battery-clear.

JP-61-28739A shows that an updating speed (learning speed) of the learning value, after the battery-clear, is accelerated until a specified period has elapsed from a starting of engine.

An update amount of the learning value per one learning is increased to accelerate the learning speed.

FIG. 2 is a time chart showing a conventional system. In this system, when a variation width of the air-fuel ratio feedback correction amount is within a stable determination value, the correction value is learned. After the battery-clear, a learning speed is increased by moderating a learning condition until a specified time period for completing the learning has passed After the specified time period has elapsed and the learning has been completed, the learning speed is varied to ordinary low speed in order to avoid an erroneous learning. After that, if an abnormality arises in the air-fuel ratio control system (for example, intake air system, fuel supply system, and the like), the air-fuel ratio feedback correction amount may rapidly change as shown in FIG. 2. FIG. 2 shows a behavior of the system in which a pipe of fuel vapor treatment system, which is connected to an intake pipe, is displaced.

After the learning is completed, the learning speed of the correction amount is maintained at low speed even if an abnormality arises in the air-fuel ratio control system and the correction value is rapidly changed. Hence, a long time period is required to complete the learning of the correction amount.

That is, a long time period is required to converge the learning value to a stable value after a rapid change of the correction amount.

SUMMARY OF THE INVENTION

The present invention is made in view of the above matters, and it is an object of the present invention to provide an air-fuel ratio controller for an internal combustion engine, which is able to learn an air-fuel ratio feedback correction amount immediately when the air-fuel ratio feedback correction amount is rapidly changed after the learning is completed, and is able to avoid an erroneous learning of the air-fuel ratio feedback correction amount when a behavior of the air-fuel ratio feedback correction amount is stable.

According to the present invention, the air-fuel ratio controller includes an exhaust gas sensor which detects air-fuel ratio or rich/lean of exhaust gas of the internal combustion engine; a feedback control means for feedback-correcting an air-fuel ratio to a target air fuel ratio based on an output of the exhaust gas sensor; a learning means for learning an air-fuel ratio feedback correction amount (difference between a detected air-fuel ratio and a target air-fuel ratio) computed by the feedback control means when a variation width of the air-fuel ratio feedback correction amount is within a stable determination value; and a stable determination means for variably setting the stable determination value according to a deviation amount of the air-fuel ratio feedback correction amount.

The stable determination value is varied according to a deviation amount of the air-fuel ratio feedback correction amount. When the air-fuel ratio feedback correction amount is rapidly changed after the learning is completed the stable determination value is increased to moderate the learning condition and accelerate the learning speed (update speed of the learning value). Hence, the air-fuel ratio feedback correction amount is immediately learned. Furthermore, when a behavior of the air-fuel ratio feedback correction amount is stable, the stable determination value is made small to avoid an erroneous learning of the air-fuel ratio feedback correction amount.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Embodiments of the present invention will be described hereinafter with reference to the drawings.

First Embodiment

Figure 1:
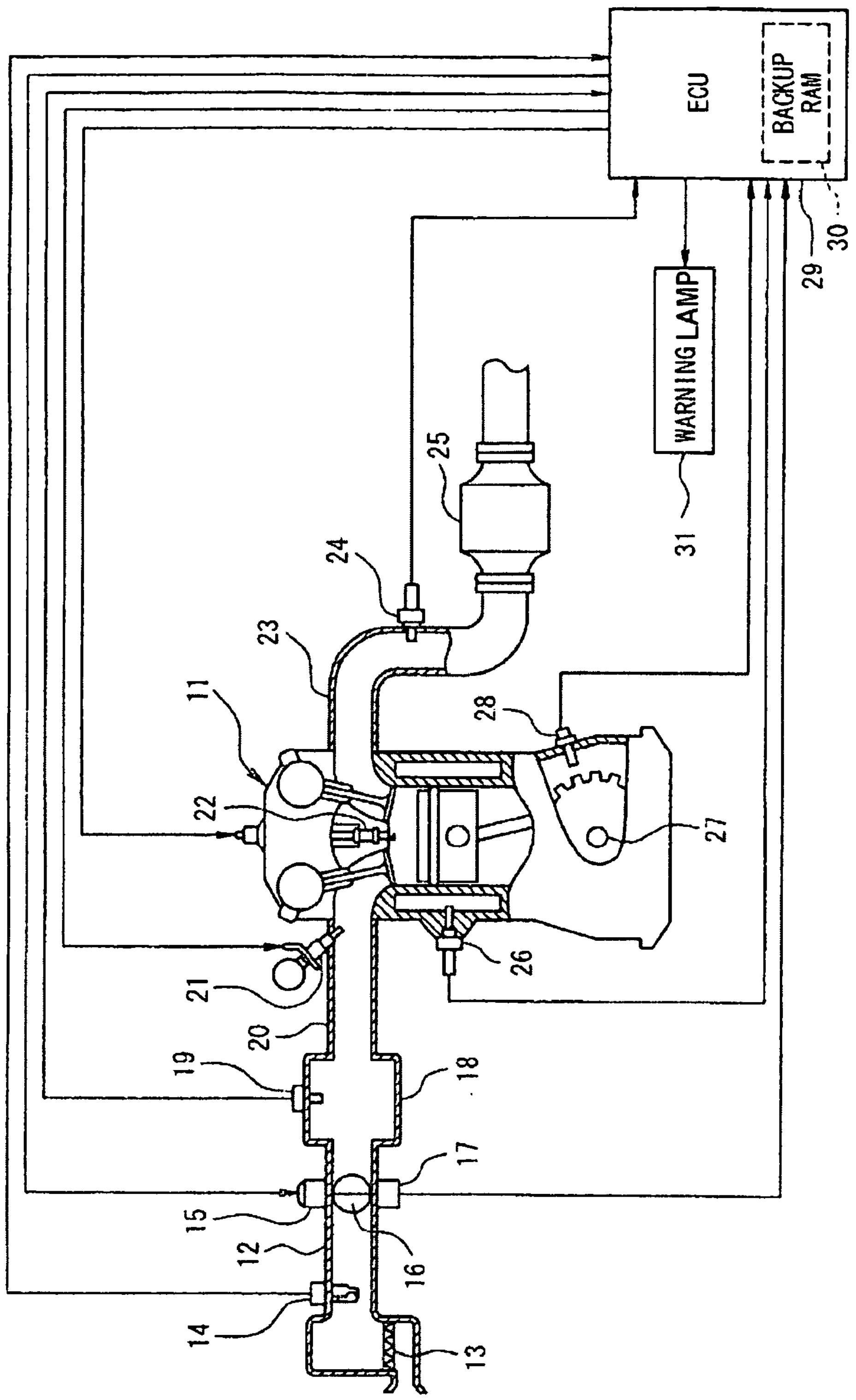
FIG. 1 is a schematic view of an engine control system according to an embodiment of the present invention.

Referring to FIGS. 1 to 6, a first embodiment will be described hereinafter. Referring to FIG. 1, an engine control system is explained.

An air cleaner 13 is arranged upstream of an intake pipe 12 of an internal combustion engine 11. An airflow meter 14 detecting an intake air flow rate is provided downstream of the air cleaner 13. A throttle valve 16 driven by a DC-motor 15 and a throttle position sensor 17 detecting a throttle position (throttle opening degree) are provided downstream of the air flow meter 14.

A surge tank 18 including an intake air pressure sensor 19 is provided downstream of the throttle valve 16. The intake air pressure sensor 19 detects intake air pressure. An intake manifold 20 which introduces air into each cylinder of the engine 11 is provided downstream of the intake pipe 12, and the fuel injector 21 which injects the fuel is provided at a vicinity of an intake port of the intake manifold 20 of each cylinder. A spark plug 22 is mounted on a cylinder head of the engine 11 corresponding to each cylinder to ignite air-fuel mixture in each cylinder.

An air-fuel ratio sensor 24 (exhaust gas sensor) which detects the air-fuel ratio of exhaust gas is provided in an exhaust pipe 23 through which the exhaust gas flows from each cylinder. A three-way catalyst 25 which purifies the exhaust gas is provided downstream of the air-fuel ratio sensor 24. An oxygen sensor which detects rich/lean of the exhaust gas may be provided instead of the air-fuel ratio sensor 24.

A coolant temperature sensor 26 detecting a coolant temperature, and a crank angle sensor 28 outputting a pulse signal every predetermined crank angle of a crankshaft 27 of the engine 11 are disposed on a cylinder block of the engine 11. A crank angle and an engine speed are detected based on the output signal of the crank angle sensor 28.

The outputs of the sensors are inputted to an electronic control unit (ECU) 29. The ECU 29 includes a microcomputer and a Read Only Memory (ROM) to control a fuel injection quantity of the fuel injector 21 and an ignition timing of the spark plug 22.

The ECU 29 feedback-corrects an air-fuel ratio of air-fuel mixture supplied to each cylinder in such a manner that the air-fuel ratio of the exhaust gas upstream of the catalyst 25 is consistent with a target air-fuel ratio, whereby the air-fuel ratio of the exhaust gas upstream of the catalyst 25 is brought into a purifying window of the catalyst 25 to enhance a purifying efficiency.

When a situation in which a variation in air-fuel feedback correction amount FAF is within a stable determination value Kst has been continued for a specified period, the ECU 29 learns this amount FAF. The learning value of the correction amount FAF is stored in a rewritable nonvolatile memory such as a backup RAM 30. A control accuracy of the air-fuel ratio is improved by use of the learning value.

According to the first embodiment, a variation width of the correction amount FAF is an absolute value Abs(FAF−FAFave) of a difference between the correction amount FAF and its smoothed value FAFave. The smoothed value FAFave of the correction amount FAF is computed according to a following equation by use of a smoothing coefficient $\alpha$ ($0<\alpha<1$), $$FAFave(i)=FAFave(i-1)\times(1-\alpha)+FAF\times\alpha$$

wherein FAFave(i) is a present smoothed value and FAFave(i−1) is a previous smoothed value.

An average of the correction amount FAF in a recent time period can be used instead of the smoothed value FAFave.

Figure 5:
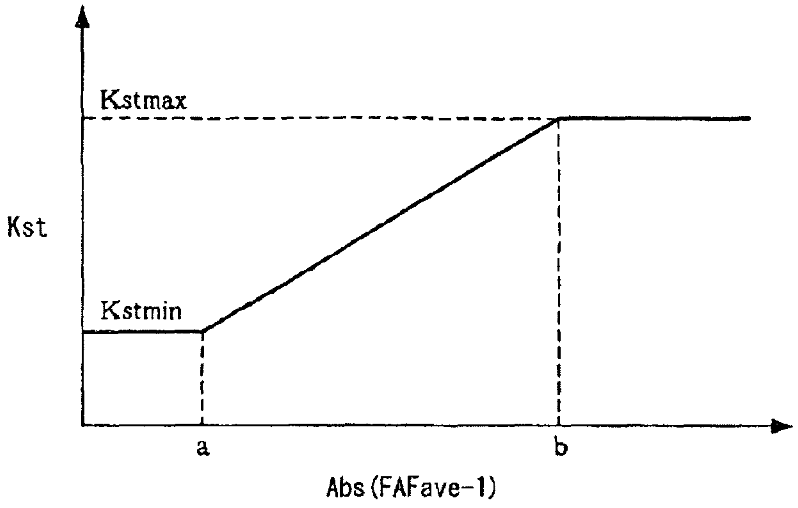
FIG. 5 is a chart showing a map for establishing a stable determination value Kst according to a deviation amount Abs(FAFave−1) of the air-fuel ratio feedback correction amount FAF.

The stable determination value Kst can be varied according to a deviation amount of the correction amount FAF. The deviation amount of the correction amount FAF is an absolute value Abs(FAFave−1) of a difference between the smoothed value FAFave and a reference value "1". FIG. 5 is a map of the stable determination value Kst. As the deviation amount Abs (FAFave−1) increases, the stable determination value Kst is increased.

In a region where the deviation amount Abs(FAFave−1) is less than or equal to a specified value "a", the stable determination value Kst is fixed at a minimum value Kstmin. If the stable determination value Kst excessively becomes small, it is difficult to perform the learning. In a region where the deviation amount Abs(FAFave−1) is greater than or equal to a specified value "b", the stable determination value Kst is fixed at a maximum value Kstmax. If the stable determination value Kst excessively becomes large, it may cause an erroneous learning.

$$Kstmin \leqq Kst \leqq Kstmax$$

As described above, the learning value of the correction amount FAF is stored in the backup RAM 30. If a battery (not shown) is detached from a vehicle to interrupt a backup power source of the backup RAM 30, the data stored in the backup RAM 30 are erased due to a battery-clear. Thus, it is necessary to perform the learning of the correction amount FAF from the first (initial value).

In the first embodiment, in a case of battery clear, the stable determination value Kst is set at a large value, for example the maximum value Kstmax, from a stating of the engine. When a specified time period for completing the learning of the correction amount FAF has elapsed, the stable determination value Kst is switched into a small value, for example the minimum value Kstmin. After that, the stable determination value Kst is varied according to the deviation amount Abs (FAFave−1) by use of the map shown in FIG. 5.

Furthermore, in the first embodiment, an abnormality diagnosis is performed in an air-fuel control system by comparing the learning value of the correction amount FAF with an abnormality determination value. If an abnormality is detected, a warning lamp 31 on an instrument panel is turned on to notify a driver.

Figure 4:
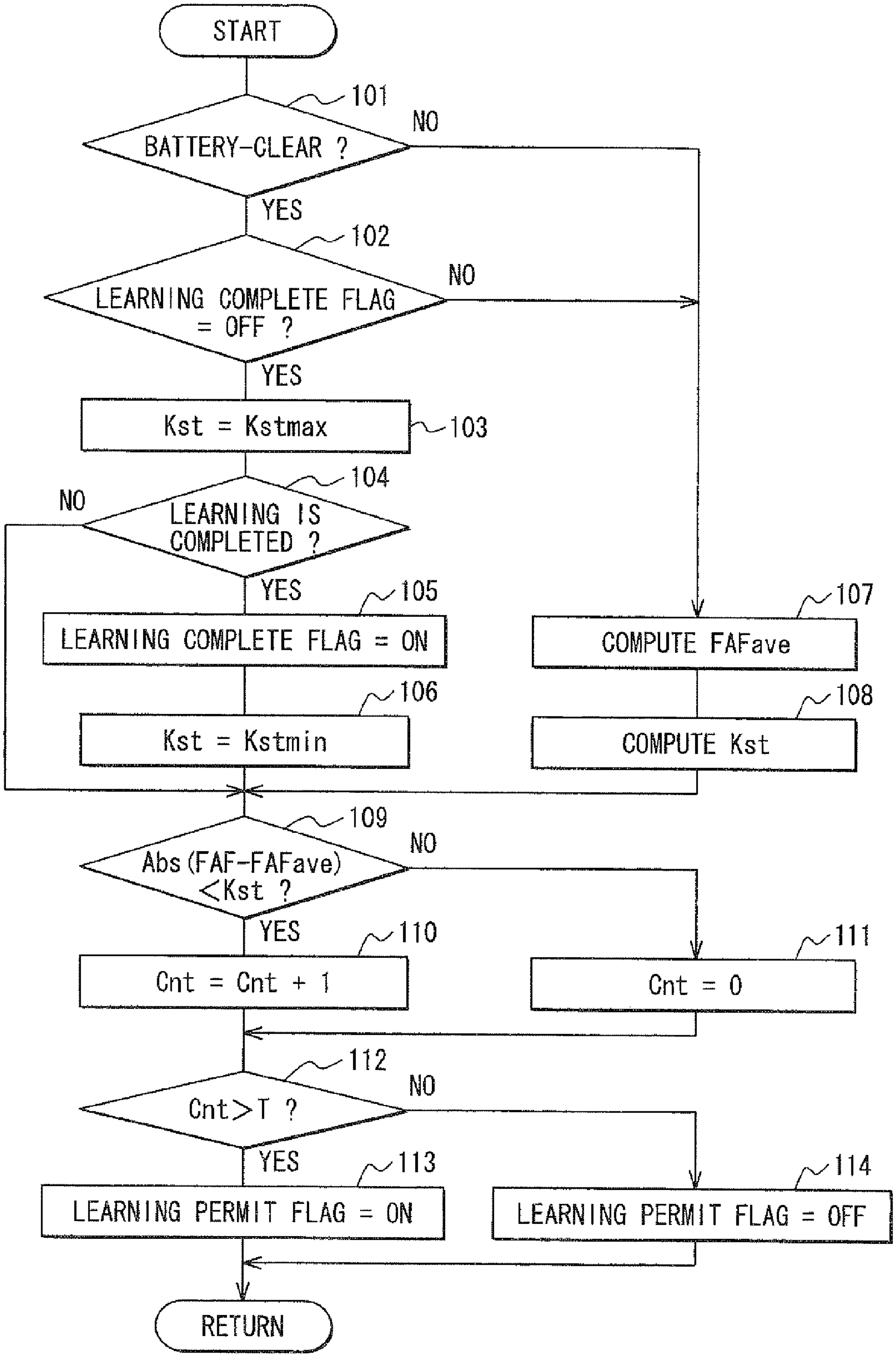
FIG. 4 is a flowchart showing a process of an air-fuel ratio learning control program according to the first embodiment.

The above learning control and the abnormality diagnosis are executed according to programs shown in FIGS. 4 and 5. The process of each program will be described hereinafter.

[Air-Fuel-Ratio Learning Control Program]

An air-fuel-ratio learning program shown in FIG. 4 is executed in a specified period during an engine operation.

In step 101, the computer determines whether the battery-clear is conducted. That is, the computer determines whether the data store in the backup RAM 30 is erased. When the answer is No in step 101, the procedure proceeds to step 107. When the answer is Yes instep 101, the procedure proceeds to step 102 in which the computer determines whether a learning complete flag is OFF. That is, the computer determines whether it is before a learning of the correction amount FAF is completed. When the learning of the correction amount FAF is completed, the learning complete flag is turned ON and information of the learning complete flag is stored in the backup RAM 30. Even while the engine is off (an ignition switch is off), the information of the learning complete flag is hold. If the battery-clear is conducted, the data store in the backup RAM 30 is erased and the learning complete flag is turned OFF (initial condition).

When the answer is Yes in step 102, the procedure proceeds to step 103 in which the stable determination value Kst is set to a large value, for example, the maximum value Kstmax. Then, the procedure proceeds to step 104 in which the computer determines whether the learning of the correction amount FAF is completed. When it is determined that the learning value of the correction amount FAF is converged into a constant value, the computer determines that the learning of the correction amount FAF is completed. Alternatively, when a specified time period has elapsed from the engine start, the computer can determines that the learning of the correction amount FAF is completed.

When the answer is No in step 104, the procedure proceeds to step 109 in which the computer determines whether the absolute value Abs(FAF−FAFave) is within the maximum value Kstmax of the stable determination value Kst. With this configuration, the stable determination value Kst is maintained at the maximum value Kstmax until the learning of the correction amount FAF is completed, so that the learning period can be shortened even if the battery-clear is conducted.

When the answer is Yes in step 104, the procedure proceeds to step 105 in which the learning complete flag is turned ON. This information is stored in the backup RAM 30. Then, the procedure proceeds to step 106 in which the stable determination value Kst is set at a small value, for example the minimum value Kstmin. Then, the procedure proceeds to step 109 in which a stable determination is performed.

When the answer is No in step 101 or 102, the procedure proceeds to step 107 in which the smoothed value FAFave is computed. Then, the procedure proceeds to step 108 in which the absolute value Abs(FAFave−1) is computed and the stable determination value Kst is computed based on the absolute value Abs(FAFave−1) by use of the map shown in FIG. 5. When the deviation value Abs(FAFave−1) is less than the value "a" or larger than the value "b", the stable determination value Kst is fixed at the minimum value Kstmin or the maximum value Kstmax.

In step 109, the computer computes the absolute value Abs(FAF−FAFave) as a variation width of the correction amount FAF, and determines whether the absolute value Abs (FAF−FAFave) is within the stable determination value Kst. When the answer is Yes in step 109, the procedure proceeds to step 110 in which a stable-time counter Cnt is counted up to measure a duration in which the absolute value Abs(FAF−FAFave) is within the stable determination value Kst.

When the answer is No in step 109, the procedure proceeds to step 111 in which the stable-time counter Cnt is reset to the initial value "0".

Then, the procedure proceeds to step 112 in which the computer determines whether the count number of the stable-time counter Cnt exceeds a specified value T. When the answer is No in step 112, the procedure proceeds to step 114 in which a learning permit flag is turned OFF to prohibit the learning. When the counter number exceeds the specified value T in step 112, the procedure proceeds to step 113 in which the learning permit flag is turned ON.

While the learning permit flag is ON, the correction amount FAF is learned and its stored value in the backup RAM 30 is updated. The learning of the correction amount FAF can be conducted in a suitable way. For example, when the correction amount FAF or the smoothed value FAFave is greater than or equal to a specified value K1 (K1>1), the learning value is corrected by a specified value K2 (K2>0). Present learning value=Previous learning value+K2 When the correction amount FAF or the smoothed value FAFave is less than or equal to K3 (K3<1), the learning value is corrected by a specified value K4 (K4<0).

$$\text{Present learning value}=\text{Previous learning value}+K4$$

Alternatively, when a difference (1−FAFave) between the reference value "1" and the smoothed value FAFave is greater than or equal to a specified value K5% (K5>0), the learning value is corrected by a specified value K6% (K6>0). When the difference (1−FAFave) is less than or equal to a specified value K7% (K7<0), the learning value is corrected by a specified value K8% (K8<0).

In any learning method, a plurality of learning ranges are defined with respect to every engine driving range, and the learning value is updated in every learning range.

[Abnormality-Diagnosis Program]

Figure 6:
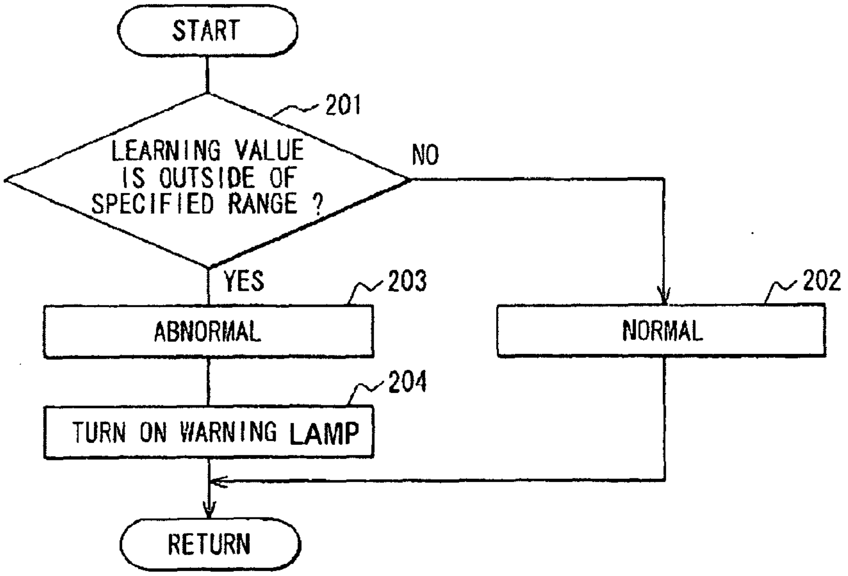
FIG. 6 is a flowchart showing a process of an abnormality diagnosis program according to the first embodiment.

An abnormality-diagnosis program shown in FIG. 6 is executed in a specified period during an engine operation. In step 201, the computer determines whether the learning value of the correction amount FAF is outside of a specified range (outside of a normal range). When the learning value is within the specified range, the procedure proceeds to step 202 in which the computer determines that the air-fuel ratio control system is normal to end the procedure.

When the computer determines that the learning value is outside of the normal range, the procedure proceeds to step 203 in which the computer determines that the air-fuel ratio system is abnormal. Then, the procedure proceeds to step 204 in which the warning lamp 31 is turned on and information indicative of abnormality is stored in the backup RAM 30.

Figure 2:
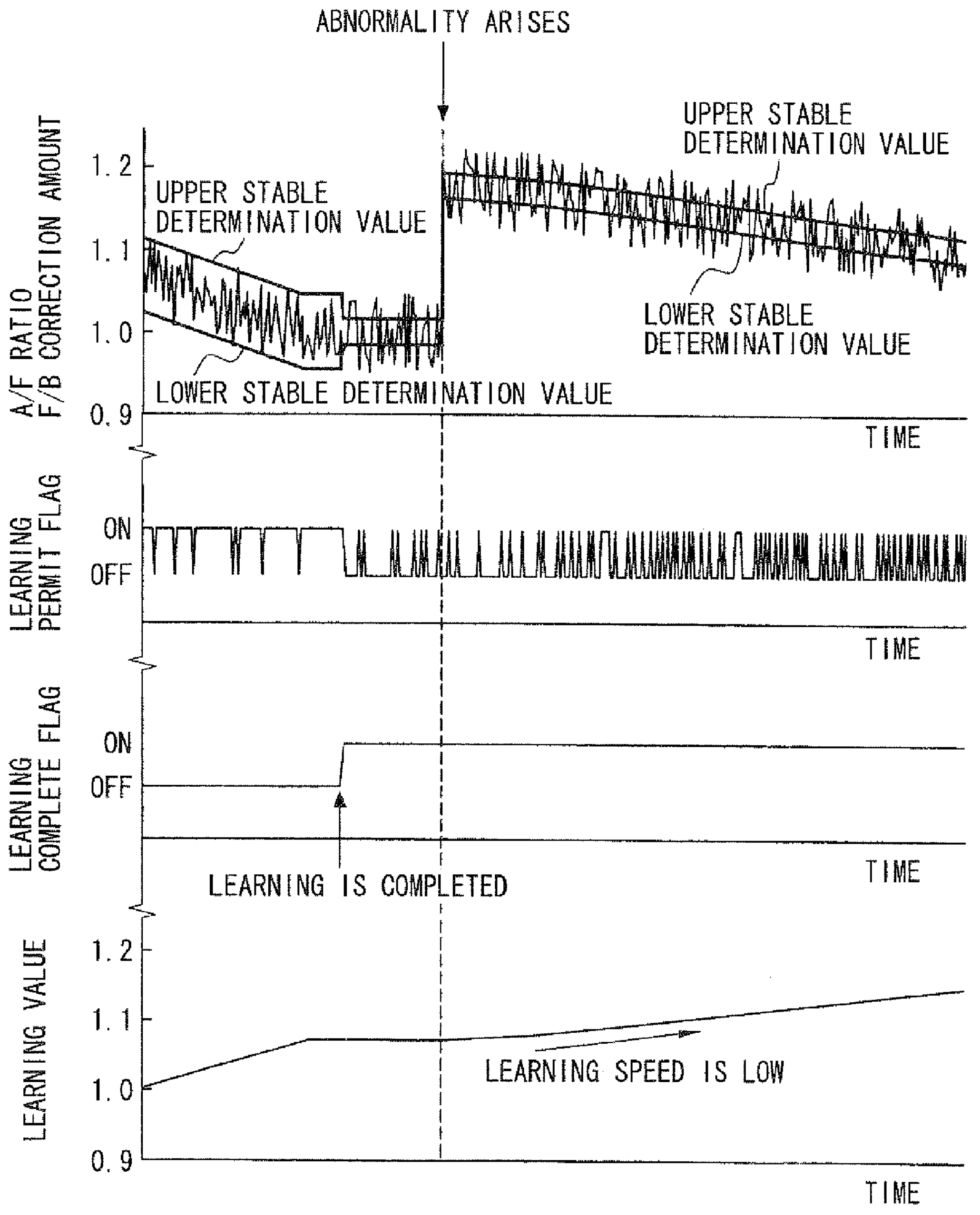
FIG. 2 PRIOR ART
FIG. 2 is a time chart for explaining a behavior when abnormality arises in a conventional air-fuel ratio feedback correction amount learning system.

In a prior art, as shown in FIG. 2, when the battery-clear is conducted, the stable determination value is set at a large value to moderate the learning condition. The learning of the correction amount FAF is easily conducted so that the learning speed is increased. After the learning is completed and the stable determination value is changed to a small value, the stable determination value is maintained at the small value even if an abnormality arises in the air-fuel ratio control system and the correction value FAF is rapidly changed. Hence, a long time period is required to complete the learning of the correction amount FAF. That is, a long time period is required to converge the learning value to a stable value after a rapid change of the correction amount FAF. In a system where an abnormality-diagnosis is conducted by comparing the learning value of the correction amount FAF with the abnormality determination value, there is a problem that it takes a long time to detect the abnormality in the air-fuel ratio control system. As a countermeasure to this problem, an abnormality-diagnosis can be performed based on both of the correction amount FAF and its learning value. However, since the correction amount FAF is easily varied relative to the learning value, the accuracy of the diagnosis may deteriorate.

Figure 3:
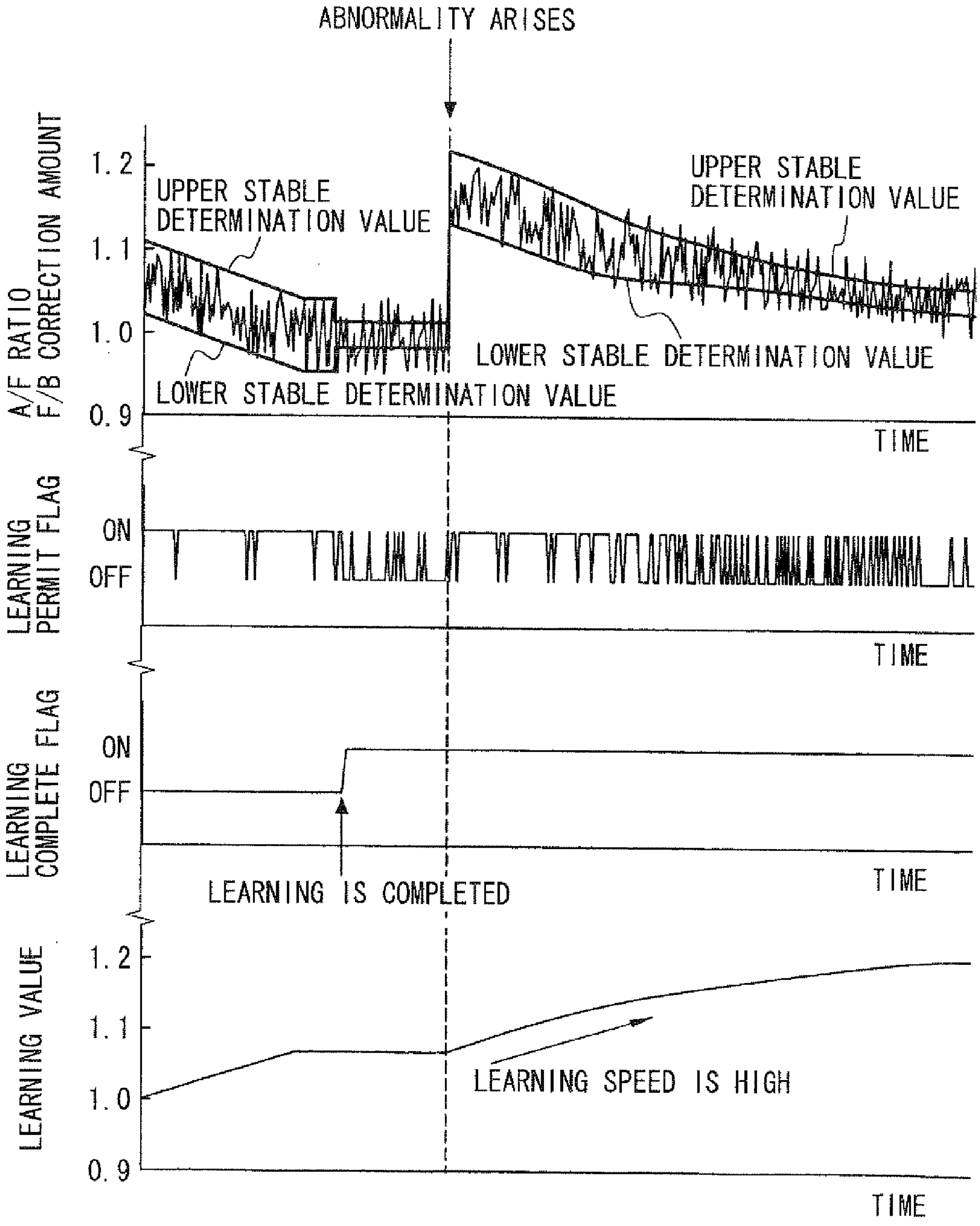
FIG. 3 is a time chart for explaining a behavior when abnormality arises in a correction amount learning system according to a first embodiment.

In contrast to this matter, according to the first embodiment, based on the map of the stable determination value Kst shown in FIG. 5, the stable determination value Kst is defined in such a manner as to increase as the deviation amount Abs(FAFave−1) increases. Thereby, as shown in FIG. 3, when an abnormality (for example, a displacement of pipe in a fuel vapor treatment system) arises in the air-fuel ratio control system to rapidly change the correction amount FAF, the learning condition is moderated by increasing the stable determination value Kst and the correction amount FAF is easily learned to increase the learning speed (update speed of the learning value). The correction amount FAF which is rapidly changed can be learned immediately. Furthermore, when the correction amount FAF is stable, an erroneous learning can be avoided by making the stable determination value Kst small. The learning period can be reduced and the erroneous leaning can be avoided even when the correction amount FAF is rapidly changed.

As described above, according to the first embodiment, since the time period required to learn the correction amount FAF can be reduced in a case of abnormality, the abnormality-diagnosis is conducted by comparing the learning value of the correction amount FAF and the abnormality determination value so that the abnormality detection period is reduced and its accuracy is improved.

Both the correction amount and its learning value can be used as an abnormality determination parameter. Alternatively, a difference between the air-fuel ratio and the target air-fuel ratio can be used as the abnormality determination parameter.

According to the first embodiment, the stable determination value Kst is set at the maximum value Kstmax from a beginning of engine start, and the stable determination value Kst is switched to the minimum value Kstmin when the predetermined time period has elapsed. After that, the stable determination value Kst is variably set according to the deviation amount Abs(FAFave−1). Hence, when the battery-clear is conducted, the stable determination value Kst can be maintained at the maximum value Kstmax until the specified time period for completing the learning is elapsed. The learning period in a case of battery-clear can be shortened.

Second Embodiment

Figure 7:
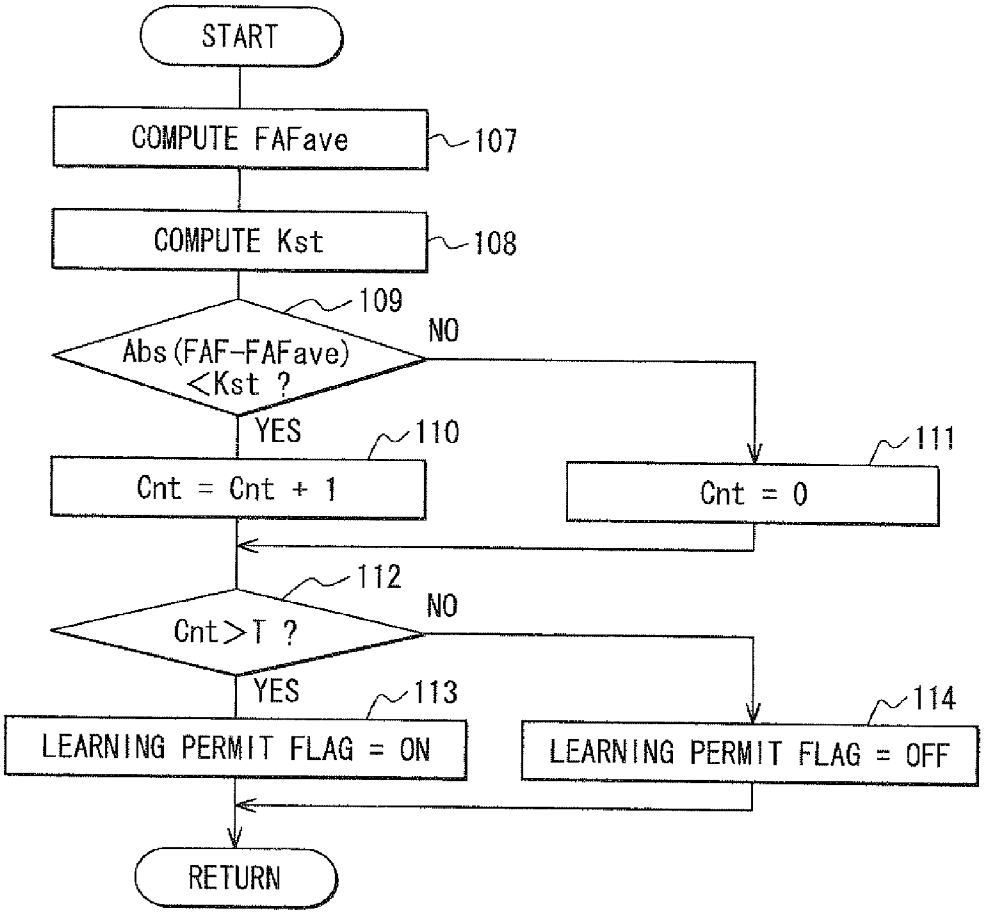
FIG. 7 is a flowchart showing a process of an air-fuel ratio learning control program according to a second embodiment.

According to a second embodiment, an air-fuel ratio learning control program shown in FIG. 7 is executed. Without respect to existence of the battery-clear, the stable determination value Kst is variably changed according to the deviation amount Abs(FAFave−1) at any time from a starting of the engine. FIG. 7 shows a process in which steps 101 to 106 are omitted from the process shown in FIG. 4. The other steps 107 to 114 are the same as the process shown in FIG. 4.

When the battery-clear is conducted, the deviation amount Abs(FAFave−1) becomes large. Hence, even if the stable determination value Kst is set according to the deviation amount Abs(FAFave−1), the stable determination value Kst is large value, so that the correction amount FAF is rapidly learned.

The stable determination value Kst can be varied stepwise according to the deviation amount Abs(FAFave−1).

Third Embodiment

Figure 8:
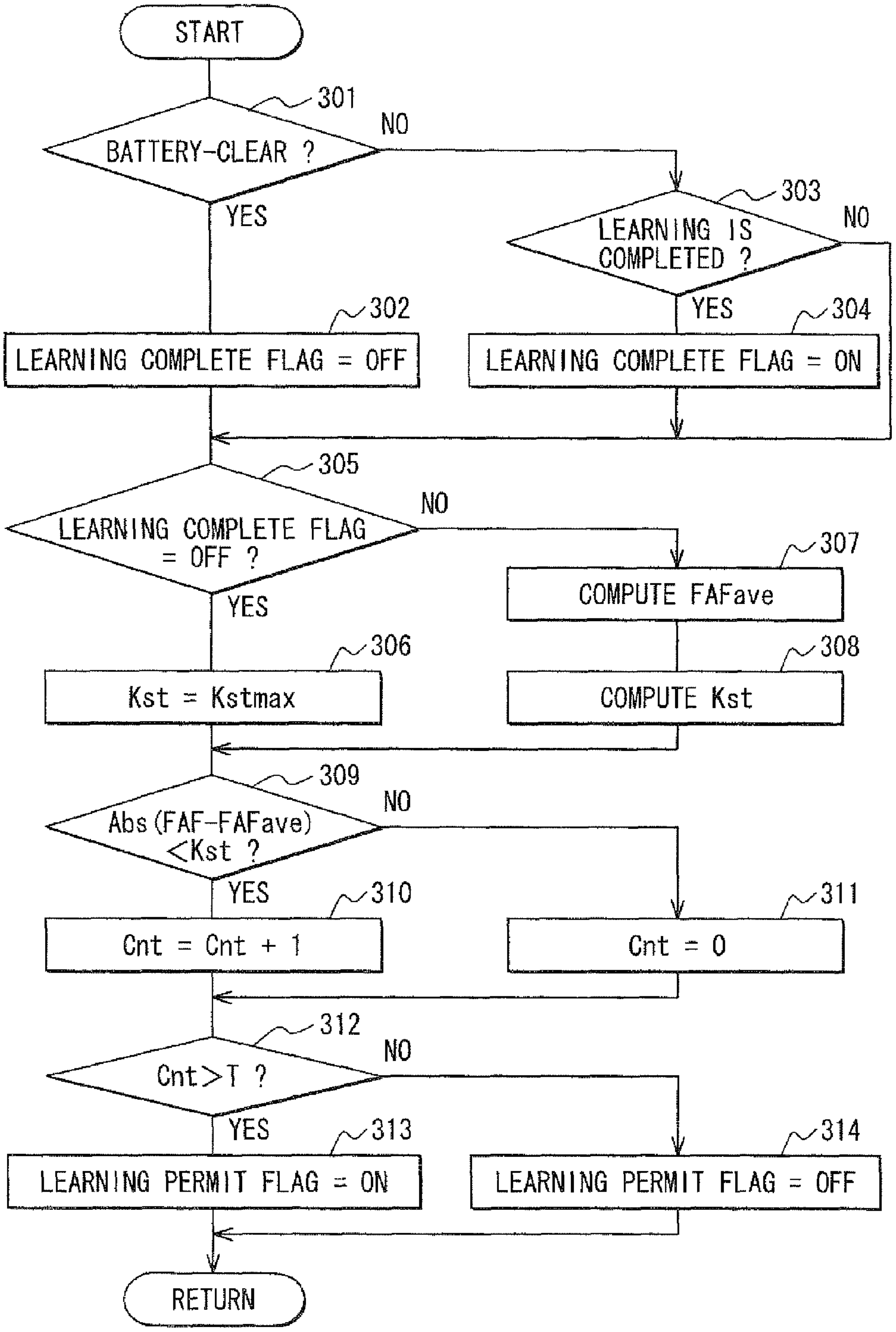
FIG. 8 is a flowchart showing a process of an air-fuel ratio learning control program according to a third embodiment.

In the first embodiment, in a case of battery clear, the stable determination value Kst is set at a large value, for example the maximum value Kstmax, from a stating of the engine. When a specified time period for completing the learning of the correction amount FAF has elapsed, the stable determination value Kst is switched into a small value, for example the minimum value Kstmin. After that, the stable determination value Kst is varied according to the deviation amount Abs (FAFave−1) by use of the map shown in FIG. 5. In a third embodiment, by executing an air-fuel ratio learning control program shown in FIG. 8, in a case of battery clear, the stable determination value Kst is set at a large value, for example the maximum value Kstmax, from a starting of the engine. When a specified time period for completing the learning of the correction amount FAF has elapsed, the stable determination value Kst is varied according to the deviation amount Abs (FAFave−1) by use of the map shown in FIG. 5.

In step 301, the computer determines whether the battery-clear is conducted. When the answer is Yes in step 301, the procedure proceeds to step 302 in which the learning complete flag is set to OFF.

When the answer is No in step 301, the procedure proceeds to step 303 in which the computer determines whether the learning of the correction amount FAF is completed. When the learning is completed, the procedure proceeds to step 304 in which the learning complete flag is turned ON, which is stored in the backup RAM 30. When the learning is not completed, the learning complete flag is maintained at OFF.

Then, the procedure proceeds to step 305 in which the computer determines whether the learning complete flag is OFF. When the answer is Yes in step 305, the procedure proceeds to step 306 in which the stable determination value Kst is set at the maximum value Kstmax.

When the answer is NO in step 305, the procedure proceeds to step 307 in which the smoothed value FAFave of the correction amount FAF is computed. Then, the procedure proceeds to step 308 in which the deviation amount Abs (FAFave−1) is computed and the stable determination value Kst is derived by use of the map shown in FIG. 5.

After the stable determination value Kst is established in step 306 or 308, the procedure proceeds to step 309 in which the computer determines whether the variation width Abs (FAF−FAFave) is within the stable determination value Kst. In steps 310 and 311, the stable-time counter Cnt measures a duration in which the variation width Abs(FAF−FAFave) of the correction amount FAF within the stable determination value Kst. In step 312, the computer determines whether the count value of the stable-time counter Cnt exceeds a predetermined value T. When the answer is Yes, the procedure proceeds to step 313 in which the learning permit flag is turned ON. When the answer is No, the procedure proceeds to step 314 in which the learning permit flag is turned OFF.

According to the third embodiment, the same advantage can be achieved as the first embodiment.

The present invention is not limited to an intake port injection engine. The present invention can be applied to a direct injection engine or a dual injection engine.

What is claimed is:

1. An air-fuel ratio controller for an internal combustion engine, comprising:

an exhaust gas sensor which detects air-fuel ratio or rich/lean of exhaust gas of the internal combustion engine;

a feedback control means for feedback-correcting an air-fuel ratio to a target air fuel ratio based on an output of the exhaust gas sensor;

a learning means for learning an air-fuel ratio feedback correction amount computed by the feedback control means when a variation width of the air-fuel ratio feedback correction amount is within a stable determination value; and a stable determination means for variably setting the stable determination value according to a deviation amount of the air-fuel ratio feedback correction amount, wherein the deviation amount of the air-fuel ratio feedback correction amount is a difference between an air-fuel ratio feedback correction amount and a reference value.

2. An air-fuel ratio controller according to claim 1, wherein the stable determination means set the stable determination value at larger value as the deviation amount of the air-fuel ratio feedback correction amount becomes larger.

3. An air-fuel ratio controller according to claim 1, wherein the learning means computes a difference between a smoothed value of the air-fuel ratio feedback correction amount and a latest air-fuel ratio feedback correction amount as the variation width of the air-fuel ratio feedback correction amount when determining whether the variation width of the air-fuel ratio feedback correction amount is within the stable determination value, and the stable determination means computes a difference between the smoothed value of the air-fuel ratio feedback correction amount and the reference value as the deviation amount of the air-fuel ratio feedback correction amount.

4. An air-fuel ratio controller according to claim 1, further comprising an abnormality diagnosis means for performing a diagnosis in an air-fuel ratio control system by comparing a learning value of the air-fuel ratio feedback correction amount with an abnormality determination value.

5. An air-fuel ratio controller according to claim 1, wherein a learning value of the air-fuel ratio feedback correction amount learned by the learning means is stored in a memory means which holds memory data by use of an in-vehicle battery as a backup power source even while the internal combustion engine is stopped, and the stable determination means sets the stable determination value at a large value in starting the engine when the stored data are erased, and then sets the stable determination value according to the deviation amount of the air-fuel ratio feedback correction amount after a specified time period has elapsed.

6. An air-fuel ratio controller according to claim 1, wherein the learning means computes a difference between a filtered value of the air-fuel ratio feedback correction amount and a latest air-fuel ratio feedback correction amount as the variation width of the air-fuel ratio feedback correction amount when determining whether the variation width of the air-fuel ratio feedback correction amount is within the stable determination value, and the stable determination means computes a difference between the filtered value of the air-fuel ratio feedback correction amount and the reference value as the deviation amount of the air-fuel ratio feedback correction amount.

7. A method of controlling an air-fuel ratio of an internal combustion engine, the method comprising:

detecting, with an exhaust gas sensor, an air-fuel ratio or rich/lean of exhaust gas of the internal combustion engine;

feedback-correcting an air-fuel ratio to a target air fuel ratio based on an output of the exhaust gas sensor;

learning a computed air-fuel ratio feedback correction amount when a variation width of the air-fuel ratio feedback correction amount is within a stable determination value; and variably setting the stable determination value according to a deviation amount of the air-fuel ratio feedback correction amount, wherein the deviation amount of the air-fuel ratio feedback correction amount is a difference between an air-fuel ratio feedback correction amount and a reference value.

8. A method according to claim 7, wherein said variably setting the stable determination value includes setting the stable determination value at larger value as the deviation amount of the air-fuel ratio feedback correction amount becomes larger.

9. A method according to claim 7, wherein said learning includes computing a difference between a smoothed value of the air-fuel ratio feedback correction amount and a latest air-fuel ratio feedback correction amount as the variation width of the air-fuel ratio feedback correction amount when determining whether the variation width of the air-fuel ratio feedback correction amount is within the stable determination value, and said variably setting the stable determination value includes computing a difference between the smoothed value of the air-fuel ratio feedback correction amount and the reference value as the deviation amount of the air-fuel ratio feedback correction amount.

10. A method according to claim 7, further comprising performing a diagnosis in an air-fuel ratio control system by comparing a learning value of the air-fuel ratio feedback correction amount with an abnormality determination value.

11. A method according to claim 7, wherein a learning value of the air-fuel ratio feedback correction amount is stored in a memory which holds memory data by use of an in-vehicle battery as a backup power source even while the internal combustion engine is stopped, and said variably setting the stable determination value includes setting the stable determination value at a large value in starting the engine when the stored data are erased, and then setting the stable determination value according to the deviation amount of the air-fuel ratio feedback correction amount after a specified time period has elapsed.

12. A method according to claim 7, wherein said learning includes computing a difference between a filtered value of the air-fuel ratio feedback correction amount and a latest air-fuel ratio feedback correction amount as the variation width of the air-fuel ratio feedback correction amount when determining whether the variation width of the air-fuel ratio feedback correction amount is within the stable determination value, and said variably setting the stable determination value includes computing a difference between the filtered value of the air-fuel ratio feedback correction amount and the reference value as the deviation amount of the air-fuel ratio feedback correction amount.

* * * * *